Feb. 16, 1926.
G. E. PHILLIPS
ANTIGLARE SHIELD
Filed July 7, 1924
1,573,272
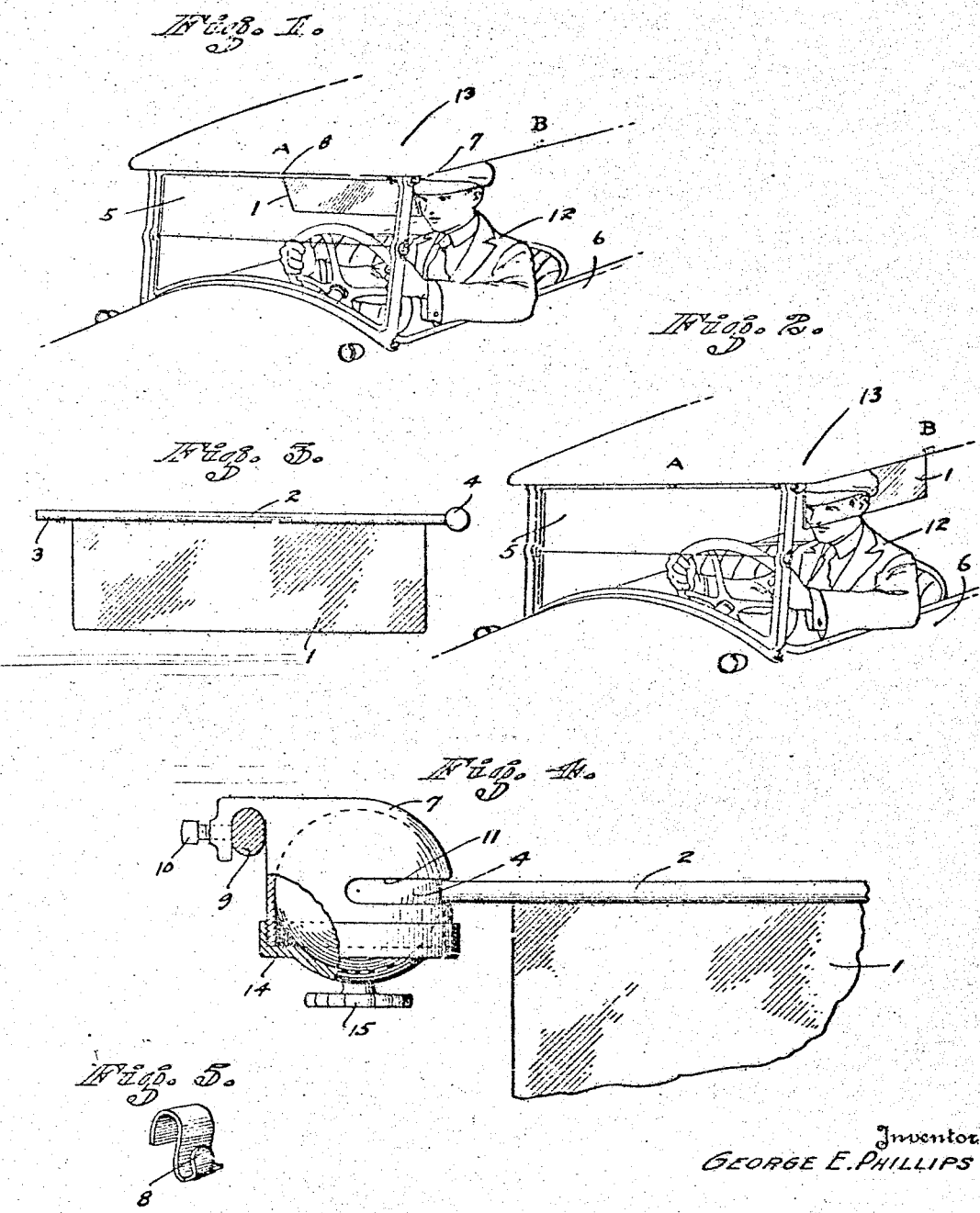
Inventor
GEORGE E. PHILLIPS Patented Feb. 16, 1926.

1,573,272

UNITED STATES PATENT OFFICE.

GEORGE E. PHILLIPS, OF IMOLA, CALIFORNIA.

ANTIGLARE SHIELD.

Application filed July 7, 1924. Serial No. 724,645.

*To all whom it may concern:*

Be it known that I, GEORGE E. PHILLIPS, a citizen of the United States, and a resident of Imola, county of Napa, State of California, have invented a new and useful Antiglare Shield, of which the following is a specification.

This invention relates to shields as used on automobiles for protecting the eyes of the drivers from the glare of the sun when same is low in the sky.

The objects of my improvements are to provide a shield of this character which may easily be installed on any automobile and which will protect the eyes of the driver from rays either coming from the front or from one side of the vehicle.

The objects mentioned may be realized in various ways in order to carry out the invention and in the drawings accompanying this specification one simple method of doing so is shown through the special arrangement of a common type glare shield whereby it may be swung from a position parallel with the windshield to a position at right angles therewith along the side of the driver's face.

Figure 1 is a perspective representation of a portion of an automobile with its driver and my improved glare shield in front of the driver parallel to the plane of the windshield, but adjusted to slant downwardly toward the driver.

Figure 2 is a similar view, but shows the glare shield arranged alongside the vehicle at right angles to its position as shown in Figure 1.

Figure 3 is an enlarged plan view of the glass glare shield itself secured to its supporting rod and showing a ball joint at one end.

Figure 4 shows the socket adapted to clamp to the windshield frame and with the ball of the glare shield rod indicated in place.

Figure 5 shows one of the snap hook supports for the free end of the rod.

In further detail, 1 is a rectangular glare shield preferably of green glass, though it may be of any shape and of any other suitable material, and may be set in a frame or not.

Along the upper edge is affixed a rod 2 having an extension 3 at one end and a ball 4 at the other.

The glare shield is adapted to be hingedly supported adjacent the windshield 5 of the automobile 6 by a socket 7 which embraces the ball, and a clip 8 which supports the free end 3 of the rod.

Two clips are used, one preferably secured to the frame of the windshield as shown at A and one to the top frame of the automobile as shown at B.

The ball socket is adapted to be secured to the upper corner frame 9 of the top, or of the windshield, in any convenient manner, such as by the screw 9, and the socket is preferably open at the bottom for the insertion of the ball and slotted at 11 so that when the ball is in the socket the rod may be swung horizontally through an arc of about ninety degrees so as to bring the glare shield from across the front of the driver 12 to along the side.

In either position the free end 3 of the rod simply hooks into one of the clips 8, which then cooperates with the socket to permit hingedly swinging the glare shield from a vertical position through any angle to a position flat against the under side of the roof 13 of the vehicle.

The ball is frictionally held within the socket by means of a lower nut 14 which screws over the lower open end of the socket and functions as a support for the under side of the ball, and a small handwheel 15 is provided on the nut so that any desired pressure may be given to the ball for retaining the shield in any adjusted position.

By the arrangement described it will be seen that the free end of the rod can be lifted out of its supporting clip 8 and swung at right angles and placed in the other clip, also that in either clip the rod is pivotally supported and may be swung at any angle to the vertical or pushed up against the top of the vehicle, yet by simply releasing nut 14 the shield may be removed if desired.

In contemplating my invention, it will be manifest that many variations of supporting sockets, clips, etc. are possible, and I therefore do not wish to be limited in these details, but desire to include in my appended claim any modification of structure coming within the spirit of the invention as disclosed.

I claim:

A glare shield comprising a sheet of antiglare material having a rigid supporting rod along one edge with an extension beyond the material at one end and a ball joint at the other, a clip for supporting the extension adapted to be attached to an automobile windshield framing and a socket for receiving the ball joint adapted to be attached to the windshield framing, said socket being adapted to be positioned at the corner windshield framing of the vehicle and being slotted, to allow the glare shield to be swung from a position in front of the driver to a position at the side of the driver.

GEORGE E. PHILLIPS.